US012718203B2

(12) United States Patent
Meiss et al.

(10) Patent No.: US 12,718,203 B2
(45) Date of Patent: Aug. 25, 2026

(54) ATTENDANCE RECORDING TERMINAL

(71) Applicant: dormakaba EAD GmbH, Villingen-Schwenningen (DE)

(72) Inventors: Elmar Meiss, Villingen-Schwenningen (DE); Florian Finkbeiner, Villingen-Schwenningen (DE)

(73) Assignee: DORMAKABA EAD GMBH, Villingen-Schwenningen (DE)

( * ) Notice: Subject to any disclaimer, the term of this patent is extended or adjusted under 35 U.S.C. 154(b) by 614 days.

(21) Appl. No.: 18/085,322

(22) Filed: Dec. 20, 2022

(65) Prior Publication Data

US 2023/0196299 A1 Jun. 22, 2023

(30) Foreign Application Priority Data

Dec. 22, 2021 (EP) .................................... 21216906

(51) Int. Cl.

| | |
|---|---|
| ***G06Q 10/1091*** | (2023.01) |
| ***G06V 20/52*** | (2022.01) |
| ***G06V 40/10*** | (2022.01) |

(52) U.S. Cl.

CPC ......... *G06Q 10/1091* (2013.01); *G06V 20/52* (2022.01); *G06V 40/103* (2022.01)

(58) Field of Classification Search

CPC ... G06Q 10/1091; G06V 20/52; G06V 40/103
See application file for complete search history.

(56) References Cited

U.S. PATENT DOCUMENTS

2018/0089630 A1* 3/2018 Lewis ................ G06Q 10/1091
2018/0225888 A1* 8/2018 Lewis ...................... G07C 9/29

(Continued)

FOREIGN PATENT DOCUMENTS

WO 2020193576 A1 10/2020

OTHER PUBLICATIONS

Anonymous: “dormakaba Terminal 97 00 Zeiterfassung und Mitarbeiter-kommunikation in Bestform”, Dec. 17, 2021, Seiten 1-12, XP055927717, URL:https://www.dormakaba.com/resource/blog/164768/8dc2cd619d1f55896b87e313c31acled/sb-9700-de-pdf-data.pdf.

(Continued)

*Primary Examiner* — Florian M Zeender
*Assistant Examiner* — Kimberly S. Bursum
(74) *Attorney, Agent, or Firm* — CANTOR COLBURN LLP

(57) ABSTRACT

An attendance recording terminal for recording attendance information of a person on the basis of an action of the person, includes a control unit, a memory management unit configured for processing and storing the attendance information of the person, at least one sensor unit configured for monitoring a surrounding zone and for outputting presence information of the person detected from the monitoring of the surrounding zone. The terminal includes an identification engine configured for identifying the person and for outputting identification information, wherein the person is identifiable on the basis of the detected presence information of the person and/or on the basis of at least one other item of personal information. The terminal includes an intent engine configured for recording an intent of an interaction of the person with the attendance recording terminal and for outputting intent information. A corresponding computer-implemented method for operating an attendance recording terminal is related.

17 Claims, 6 Drawing Sheets

(56) References Cited

U.S. PATENT DOCUMENTS

| | | | | |
|---|---|---|---|---|
| 2021/0350639 | A1 | 11/2021 | Sabripour et al. | |
| 2021/0350642 | A1* | 11/2021 | Schneider .......... | G07C 9/00571 |
| 2021/0357485 | A1 | 11/2021 | Kosugi et al. | |
| 2024/0160712 | A1* | 5/2024 | Tomita ................... | G07C 9/257 |

OTHER PUBLICATIONS

Anonymous: "Employee Time Clock App: Tanda", May 29, 2021, Seiten 1-9, XP055928998, URL:https://web.archive.org/web/20210529060409/https://www.tanda.co/features/employee-time-clock-app.

European Search Report; EP Application No. 21 21 6906; Date of Completion of Search Jun. 13, 2022; 2 pages.

* cited by examiner

ATTENDANCE RECORDING TERMINAL

CROSS-REFERENCE TO RELATED APPLICATIONS

This application is related to and claims the benefit of European Patent Application No. 21216906.4, filed on Dec. 22, 2021, the contents of which are herein incorporated by reference in their entirety.

TECHNICAL FIELD

The present disclosure relates to an attendance recording terminal for recording attendance information of a person on the basis of an action of the person. In particular, the disclosure relates to a time recording terminal. Furthermore, the present disclosure relates to a computer-implemented method for operating a corresponding attendance recording terminal, in particular time recording terminal, for recording attendance information of a person on the basis of an action of the person, and a corresponding computer program.

BACKGROUND

Attendance recording terminals are particularly widespread in the world of work for recording the attendance of an employee. Attendance recording terminals are often found in office buildings, factory buildings or even hospitals. A system is provided by means of the attendance recording terminals, which allows electronic recording and storage of employee attendances. In the case of a time recording terminal, the terminal is also used to record and store the working hours completed. In general, in this context, the attendance information of a person is mentioned, which person would like to clock in for work via the attendance recording terminal or, for example, log out for a break or at the end of the working day or clock out of the system.

Attendance recording terminals allow a point to be provided for people to interact centrally, for example at a point in the entrance area of an office building or on every floor or in every department of a building/company, via which the clocking processes can be easily implemented. A central system is then available to the employer, for example via the memory management unit of the attendance recording terminal, via which the employer can track the attendance information of the individuals without significant effort.

Even though the known attendance recording terminals already automate the recording of attendance information of people and is considerably simplified compared to each person manually tracking their attendance or sending it individually to the employer, the interaction is still in need of improvement. The operation of the attendance recording terminals should be designed to be more user-friendly. Attendance recording terminals regularly require that the interacting people approach the attendance recording terminal, which is often placed at a point on a wall, and perform inputs at the location, for example via a display or another interface in the immediate vicinity of the attendance recording terminal. It is often necessary for the person to hold an individual mobile access medium, such as a personal key card, a badge or the like, directly up to the attendance recording terminal in order to clock in or out. There is often also the risk of incorrect clocking processes, whether unintentional or intentional, for example to carry out a clock-in process for a third party or to clock in without going to the workstation.

SUMMARY

Against this background, the present disclosure provides an attendance recording terminal in which the operation of the attendance recording terminal or the interaction thereof with people is simplified. In particular, the risk of incorrect clocking processes, whether intentional or unintentional, should be reduced.

Furthermore, the present disclosure provides a corresponding computer-implemented method for operating an attendance recording terminal or a corresponding computer program in order to simplify operation or interaction and to reduce the risk of incorrect clocking processes.

According to the disclosure, the advantages are achieved by providing the proposed attendance recording terminal, in particular time recording terminal, for recording attendance information of a person on the basis of an action of the person, and by the proposed computer-implemented method for operating an attendance recording terminal, and by the proposed computer program having the features of the corresponding independent claims. In addition, preferred embodiments can be found in the dependent claims and the description.

Specifically, an attendance recording terminal for recording attendance information of a person on the basis of an action of the person is proposed. The proposed attendance recording terminal can in particular be a time recording terminal. The proposed attendance recording terminal includes:

- a control unit,
- a memory management unit, wherein the memory management unit is configured for processing and storing the attendance information of the person,
- at least one sensor unit, wherein the sensor unit is configured for monitoring a surrounding zone and for outputting presence information of the person detected from the monitoring of the surrounding zone,
- an identification engine, wherein the identification engine is configured for identifying the person and for outputting identification information, wherein the person can be identified on the basis of the detected presence information of the person and/or on the basis of at least one other item of personal information, and
- an intent engine, wherein the intent engine is configured for recording an intent of an interaction of the person with the attendance recording terminal and for outputting intent information.

As proposed, the control unit is configured for receiving and processing at least the following clocking information:

- the identification information from the identification engine, and
- the intent information from the intent engine.

As proposed, the control unit is configured for interacting with the memory management unit in such manner that if received clocking information matches predefined clocking information, the attendance information of the person is automatically processed and stored.

With regard to the computer-implemented method, a computer-implemented method for operating an attendance recording terminal, in particular time recording terminal, for recording attendance information of a person on the basis of an action of the person is proposed in detail, said method comprising at least the following steps:

- detecting presence information of the person, wherein detected presence information is generated by monitoring a surrounding zone with at least one sensor unit, identifying the person through an identification engine, wherein identification information is generated on the basis of the detected presence information of the person and/or on the basis of at least one other item of personal information, detecting an intent of an interaction of the person with the attendance recording terminal through an intent engine, wherein intent information is generated, processing and storing attendance information of the person in a memory management unit if it is at least determined that the identification information and the intent information correspond to predefined information.

The features and advantages described in the context of the proposed attendance recording terminal can be transferred accordingly to the proposed computer-implemented method for operating an attendance recording terminal. The computer-implemented method can be configured for operating that proposed and described attendance recording terminal. The proposed and described attendance recording terminal is in turn preferably configured for carrying out the proposed computer-implemented method for operating an attendance recording terminal. In this respect, the features and specific advantages relating to the attendance recording terminal or the method for operating the attendance recording terminal are generally only simply described together. Features described in connection with the device of the attendance recording terminal can be included in claims relating to the computer-implemented method accordingly.

An essential advantage of the present disclosure is that a clocking process can be carried out at the attendance recording terminal without the interacting person having to take an active action reflecting the corresponding clocking request at the attendance recording terminal itself. Rather, the attendance recording terminal can automatically and independently record both the identification information that basically represents the person and also the intent information that represents the intent of the interaction and automatically carry out a comparison, whereupon the clocking process is carried out if the comparison is successful. Those interactions between people and the attendance recording terminal can be carried out from a distance in this case, since the basis of the recording is the monitoring of a surrounding zone by means of the sensor unit of the attendance recording terminal. Direct interaction of the person directly in front of the attendance recording terminal can be possible, but does not have to be necessary.

The control unit can be designed as an integral part of the attendance recording terminal or separately. For example, the control unit can also be displayed at a location other than within a housing of the attendance recording terminal or online, for example, and can communicate with the attendance recording terminal via a communication connection and control processes such as clocking processes.

The memory management unit can be provided locally and, for example, be an integrated part of the attendance recording terminal. Alternatively, the memory management unit can also be provided online in the cloud. The attendance recording terminal can then establish an online connection to the memory management unit, for example via the control unit, and in this way communicate with the memory management unit.

Master records of employee data can be stored in the memory management unit. Personal data stored there can, for example, include information about the working hours of the person, the language the person speaks so as to enable specific interaction with the attendance recording terminal, or individual preferences or requirements for the purpose of user-specific interaction. For example, it can be stored there if a person has a visual impairment or hearing impairment in order to enable interaction that is individually tailored to the needs.

The at least one sensor unit monitors the surrounding zone in the vicinity of the attendance recording terminal, such as a corridor of an office building at the attendance recording terminal or an entrance area of a building or a floor. This is where people are expected to interact with the attendance recording terminal. The sensor unit can include one or a plurality of sensors. Various sensor units or sensors can also be provided. The sensor unit or sensors can be integrated as an integral part of the attendance recording terminal, for example in its housing, or can be arranged entirely or partially outside of the attendance recording terminal, which is usually mounted on or in the vicinity of a wall. A communication connection can then advantageously be provided between the sensor unit and the attendance recording terminal, in particular its control unit.

Based on the monitoring, the sensor unit provides detected presence information of the person recorded in the surrounding zone. This may only be information that a person is present. Or there can also be a higher level of detail in the detected presence information, for example by a photo of the person being output as detected presence information.

The identification engine can also be called an identification device. It provides a device to establish the identity of a person interacting with the attendance recording terminal. The identification engine can be implemented by software in the attendance recording terminal or as part of the control unit. Identification information is output via the identification engine. The identification information can clearly represent the interacting person or assign them to a group of people.

For this purpose, the identification engine can use the detected presence information previously provided by the sensor unit. For example, a photo taken by the sensor unit can be analyzed by the identification engine and assigned to a person. In the example of recording by the sensor unit, for example by means of wireless communication with a mobile access medium, such as an access card, a badge or a mobile device of the interacting person, that detected presence information, for example in the form of the identifier of the key card, can be further processed in the identification engine and used for identification purposes.

Alternatively or additionally, the identification can also take place based on at least one item of other personal information. It is conceivable that the identification engine also has its own sensors, or that the sensor unit first provides detected presence information that basically only represents the attendance of a person, and then further personal information is obtained from the sensor unit, which serves to identify the person.

The other personal information does not have to include any personal data, but rather only enables the person to be identified unambiguously or to be able to clearly distinguish one person from other persons.

The intent engine can also be called an intent recognition device. It provides a device to determine the intent of the interaction of a person with the attendance recording terminal. Corresponding intent information is output by the intent engine. The intent engine can be implemented by software in the attendance recording terminal.

Various data from the intent engine can be used as a basis to record the intent of the person. On the one hand, data stored in the master record of the person can be available as a variable for evaluation, for example when the shift or working time of the interacting person begins or it is generally a time at the beginning of the working day and the person appears at the attendance recording terminal, presumably to clock in for work. The movement data recorded by the sensor unit or other sensors can also be used as a basis. For example, it can be used to record whether a person is moving in the direction of the interior of the building or in the direction of the exit.

It is also possible that more actions can be carried out at the attendance recording terminal than just clocking-in or clocking-out processes. For example, it may be possible for a person to want to query a credit stored on their key card or their badge, for example for use in a canteen. The intent engine can then, for example, also include the time of day in the analysis, which intent lies behind the interaction of the person with the attendance recording terminal, since the credit is regularly queried, in particular at lunchtime.

Predetermined types of movements, such as of the key card or badge, by the person interacting with the attendance recording terminal can also represent a predetermined intent, which the intent engine then recognizes and outputs corresponding intent information. There can also be intents to interact with the attendance recording terminal, which intents do not require a clear identification of the person. In the case of such intents, it may be sufficient to assign the detected person to a group of people who can or may in principle interact with the attendance recording terminal.

In the latter case in particular, the identification information can advantageously also be processed downstream or the identification engine can advantageously operate after the intent engine. If the specific identification of the person (e.g. a clear assignment of which employee is involved) is not necessary for the desired interaction and the corresponding generated intent information, then the identification engine can only output simplified identification information, for example in the form of belonging to the approved group of people, without carrying out an in-depth analysis of which person it is specifically.

In the corresponding proposed computer-implemented method, the two steps of identifying the person and recording an intent of an interaction of the person with the attendance recording terminal do not necessarily have to take place in the order mentioned, but can also be reversed (first detecting the intent, then identifying the person) or even run in parallel.

The control unit receives the identification information, which is representative of the interacting person or group of persons, from the identification engine or is provided with it by the identification engine, which can itself also be integrated into the control unit. Furthermore, the control unit receives the intent information, which is representative of the intent of the interaction, from the intent engine or is provided with it by the intent engine, which itself can also be integrated into the control unit. The control unit processes those two items of information as clocking information. In this case, a comparison takes place automatically by the control unit interacting with the memory management unit. The received clocking information (identification information and intent information) is compared with predefined clocking information which is stored in the memory management unit in a person-specific manner or specifically for the identified group of people. If the received and predefined clocking information match, the corresponding clocking process is implemented, i.e. the attendance information of the person is automatically processed and stored.

In the proposed attendance recording terminal or during the proposed computer-implemented method, there is basically a detection of the person in a first step, an identification of that person in a second step, a determination of the intent of the interaction in a third step (whereby step two and three can also run in reverse or in parallel), and then automatically a corresponding clocking process or no clocking process in a fourth step. In this way, clocking processes at attendance recording terminals are automated and significantly simplified. This is because the process described is based on data automatically recorded via the sensor unit and personal data stored in the memory management unit.

According to one embodiment, it is proposed that the control unit is also configured for receiving and processing the detected presence information of the person from the sensor unit. In particular, the detected presence information itself can also represent further clocking information, which clocking information is compared with predefined clocking information and on which clocking information the automatic implementation of the clocking process is thus made dependent.

According to a further embodiment, it is proposed that the surrounding zone be divided into a number of sub-zones. The plurality of sub-zones preferably includes at least the following sub-zones:

a near zone, as well as a distant zone, wherein the near zone is arranged closer to the attendance recording terminal than the distant zone. The sensor unit outputs specific detected presence information of the person as a function of one or a plurality of zone-specific signal or signals, wherein the zone-specific signal/signals is/are triggered by the person in the sub-zone. The near zone is therefore arranged closest to the attendance recording terminal. Triggering a zone-specific signal is not to be understood exclusively as limiting such that a person would have to actively trigger a signal. Rather, the zone-specific signal is caused by the person, for example by the presence or by the type of advancing movement of the person in the respective sub-zone. For example, a person in the sub-zone or their movement can be tracked via camera tracking and a zone-specific signal can be generated from this. The zone-specific signal can be effected or caused by the presence or the movement of the person in the sub-zone.

The specific detected presence information of the person can preferably include information or a plurality of items of information about the following circumstances:

in which sub-zone the person is located, and/or which sub-zone the person is entering, and/or what a movement pattern of the person looks like.

The movement pattern of the person can relate in particular to a movement direction of the person and/or a movement speed of the person. The movement direction can be represented by a direction vector over time. The movement pattern of the person within a surrounding zone or sub-zone can be recorded and used as a basis for the analysis of the intent of the interaction. Using the information regarding the sub-zone which a person is entering, a change of zone by a person can be recorded and can be used as a basis for the analysis.

The technical means for detecting the position, i.e. the presence or the movement of the person in a sub-zone, for example, can advantageously be the sensor unit. The sensor unit advantageously includes a camera.

The determination of the presence of the person, in which specific sub-zone they are currently located, or the movement pattern of the person can thus advantageously be used to interpret the intent of the person with the attendance recording terminal.

According to an advantageous further development, the specifically detected presence information of the person can be analyzed using machine learning and, for example, an intent of the interaction of the person can be recorded. For this purpose, for example, a recorded behavior of the person, such as a movement pattern, can be compared with known learned behavior or movement patterns. For this purpose, the control unit or identification engine or intent engine can have an AI with a machine learning engine.

Additionally or alternatively, the different engines (devices) of the attendance recording terminal or the control unit or also different sensors (of the sensor unit) can only be activated depending on when a person is in a specific sub-zone or moves in or enters a sub-zone in a specific way. For example, the identification engine and also the intent engine can be in a sleep mode (energy-saving mode) until the sensor unit has detected the presence in a specific sub-zone.

Furthermore, it can be provided that the identification engine is configured in such manner that it is only activated when the person enters the surrounding zone, in particular the near zone. The identification engine can preferably be activated in this way as a function of a or the movement pattern of the person, in particular a movement direction of the person and/or a movement speed of the person. An example can be that a faster movement of a person is detected, which then leads to activation of the identification engine. Advantageously, the attendance recording terminal can then be designed to save more energy. In this way, an interaction with the attendance recording terminal can also be more user-friendly and faster, since a two-stage activation of the identification engine results in less time until the system is active.

Alternatively or additionally, it can be provided that the plurality of sub-zones further comprises a middle zone, wherein the middle zone is arranged closer to the attendance recording terminal than the distant zone. The level of detail of the analysis of the movements or the location can thus advantageously be further increased and thus the interpretation of the movement of the person for the purpose of recording the intent of the interaction can be improved.

According to a further embodiment, it is proposed that the identification engine is also configured for verifying the person and for outputting verification information, wherein the person is verified on the basis of the detected presence information of the person and/or on the basis of the other personal information. The additional second loop in the form of the verification of the person, which also runs after the basic identification, can reduce the risk of incorrect clocking processes. In this way, it can advantageously be prevented that a person performs a clocking process for another third party. The clocking process can also be made dependent on that verification information, by the verification information serving as further clocking information, which is compared with corresponding stored clocking information.

Furthermore, it can be provided that the identification engine comprises at least one anti-spoofing engine for differentiating between a real person and a photo of a person. In this way, it can be advantageously recognized if a person is deliberately being deceitful, for example by holding up a photo to the sensor unit, i.e. a camera in this case, and thus trying to trigger a clocking process.

According to a further embodiment, it is provided that the sensor unit comprises at least one of the following units:

at least one camera,
at least one biometric sensor,
at least one proximity sensor and/or
at least one mobile access engine.

In particular using the camera, the movement or also the posture can advantageously be used as a basis for the analysis via camera tracking to determine which person is involved and which intent of the interaction is desired. In the case of a mobile access engine (mobile access device), the mobile access engine of the sensor unit can be configured such that, in order to detect the presence information of the person, a communication exchange takes place between the mobile access engine and a mobile access medium of the person. The mobile access engine can be implemented as software in the attendance recording terminal or in the sensor unit or can comprise software via which software the communication exchange between the person and the sensor unit can be evaluated and, if necessary, the detected presence information can be generated and output. Contactless detection of the person by the sensor unit and thus interaction of the person with the attendance recording terminal is particularly advantageous since the person no longer needs to approach the attendance recording terminal.

According to a further embodiment, the identification engine can comprise at least one of the following units:

at least one camera,
at least one biometric sensor, and/or
at least one mobile access engine.

In the case of the mobile access engine (mobile access device), the mobile access engine of the identification engine is configured in such manner that, in order to identify the person, a communication exchange takes place between the mobile access engine and a mobile access medium of the person. The person who is interacting with the attendance recording terminal can advantageously be precisely identified by separately recording personal data by means of at least one of the mentioned units of the identification engine.

According to a further embodiment, the mobile access medium of the person can be designed as an access card, badge and/or mobile device. In this way, particularly simple contactless communication can take place between the person and the attendance recording terminal.

According to a further embodiment, the intent engine can be configured in such manner that at least one of the following items of information is used to record the intent of the interaction of the person with the attendance recording terminal:

a movement direction of the person, and/or
a signal input by the person.

In the case of recording the intent based on the movement direction, the intent engine can also be configured in such manner that the movement direction is recorded via camera tracking and/or via an ultra-wideband signal. Advantageously, the interaction between the person and the attendance recording terminal can take place contactlessly from a distance in this way, and it also does not require any individual input from the person, for example on the attendance recording terminal itself. In principle, directions of movement or specific movements of the person themselves or their mobile access medium, for example, can represent specific intents of an interaction.

In the mentioned case of a signal input by the person, the intent engine can also be configured in such manner that the signal input takes place as follows:

the intent engine receives a signal which is input by the person on a/the mobile device and which represents the intent of the interaction, and/or the intent engine receives a voice input from the person representing the intent of the interaction or recognizes a gesture input from the person representing the intent of the interaction, and/or the intent engine processes a signal which is input by the person at the attendance recording terminal, preferably at a touchscreen display, and which represents the intent of the interaction, and/or the intent engine receives a signal which is triggered by the person by means of an action with a/the access card, a/the badge, and/or a/the mobile device and which represents the intent of the interaction.

The action of the person with their mobile access medium, such as the badge, can actually be a normal movement to initiate a clocking process (holding up the badge), whereby a predetermined sequence of movements, such as holding up the badge twice, repeatedly in quick succession, represents a specific intent.

According to a further embodiment, an interaction confirmation engine (interaction confirmation device) can also be provided. In this case, the interaction confirmation engine can be configured for receiving clarifying intent information, wherein the clarifying intent information verifies or falsifies the intent of the interaction of the person with the attendance recording terminal. In particular, the clarifying intent information can represent further clocking information for the control unit. In this way, another back-up for the clocking process is advantageously provided. The clarifying intent information can again confirm or deny the intent previously already recorded by the attendance recording terminal. The interaction confirmation engine can be implemented at least partially as software in the attendance recording terminal or in the control unit, via which software corresponding signals or actions of the person can be evaluated to confirm or deny the previously recorded intent.

According to a further embodiment, the interaction confirmation engine can be designed as a voice detection engine (voice recognition device) for recording a voice input by the person and/or as a gesture detection engine (gesture recognition device) for recording a gesture input by the person. In this way, the intent previously recorded by the attendance recording terminal can be confirmed by the person via a simple voice input or via a predetermined gesture. The security of the clocking processes, to the extent that no incorrect clocking processes take place, can be further increased. The voice detection engine and/or the gesture detection engine can be implemented as software or comprise software.

According to a further embodiment, a feedback engine (feedback device) can also be provided. The feedback engine can be configured in such manner that feedback information can be output when the person has interacted with the attendance recording terminal. This feedback information can advantageously serve to inform the person which clocking process is desired or has even been performed. This feedback information can also be the basis for the process described above, that clarifying intent information is to be provided for the interaction confirmation engine. Depending on the feedback reported back to a person, this person can send positive, clarifying intent information to the attendance recording terminal to verify the intent, or negative information in order to prevent the planned action or clocking process.

In particular, the feedback information can be designed as follows:

a voice signal, and/or a graphic signal, and/or a haptic signal, in particular a vibration signal.

The feedback information can be output on the attendance recording terminal and/or on a/the mobile access medium of the person. A voice signal can also be understood as a simple acoustic signal.

In particular, the feedback information can also include a request or user information with which an operator of the attendance recording terminal (e.g. employer) requests the person who is interacting with the attendance recording terminal as a user to do something (e.g. request "report to the HR department"), "Please reduce overtime" etc.) or informs them about something (e.g. time account balance).

Provision can be made for sensitive personal information to be output only on a mobile device of the person, while general and non-sensitive information is output only on the terminal or on the terminal and the mobile device.

The feedback engine can be implemented at least partially as software in the attendance recording terminal or in the control unit, via which software it can be checked, on the one hand, using the memory management unit whether the person wants feedback at all and, on the other hand, the corresponding feedback can be initiated. Accordingly, the feedback engine or the control unit can be in communication with a voice output unit if, for example, a voice signal is desired as feedback information.

According to a further embodiment, the memory management unit can include a master record of personal data, wherein the memory management unit is configured in such manner that when the attendance information has been stored, the memory management unit checks in the data of the person as to whether feedback is desired about the interaction of the person with the attendance recording terminal. In this way, the interaction between people and the attendance recording terminal can advantageously take place in an individualized and in a particularly user-friendly manner, since it is specific to the respective person. It is particularly advantageous, for example, to check in the master record of the personal data before outputting feedback information as to whether the specific person who is performing the interaction and was previously identified wants feedback at all, and if so, in what form the feedback is wanted. The feedback engine can therefore be configured in such manner that person-dependent feedback information can be output. For example, a voice signal can be given as feedback in the language that the interacting person speaks. Furthermore, it can also be stored specifically for the person whether verbal feedback is desired at all or whether graphic or haptic feedback is desired. In addition, the individual needs of people can be addressed. In the event that a person has a hearing impairment, a voice signal can be dispensed with as feedback information, but only a graphic and/or haptic signal can be output. In the case of a person with a visual impairment, for example, an acoustic or voice signal or a haptic signal can preferably be used.

Furthermore, the advantage is achieved by providing a computer program, which computer program includes commands which, when the program is executed by a processor of an attendance recording terminal, causes the attendance recording terminal to carry out the steps of the proposed method described above or below.

Furthermore, a computer-readable medium is proposed, on which the aforementioned computer program is stored.

BRIEF DESCRIPTION OF THE DRAWINGS

Further advantageous and preferred configurations emerge from the following description with reference to the figures. In the drawings, which only show exemplary embodiments.

DETAILED DESCRIPTION OF THE DRAWINGS

Figure 1:
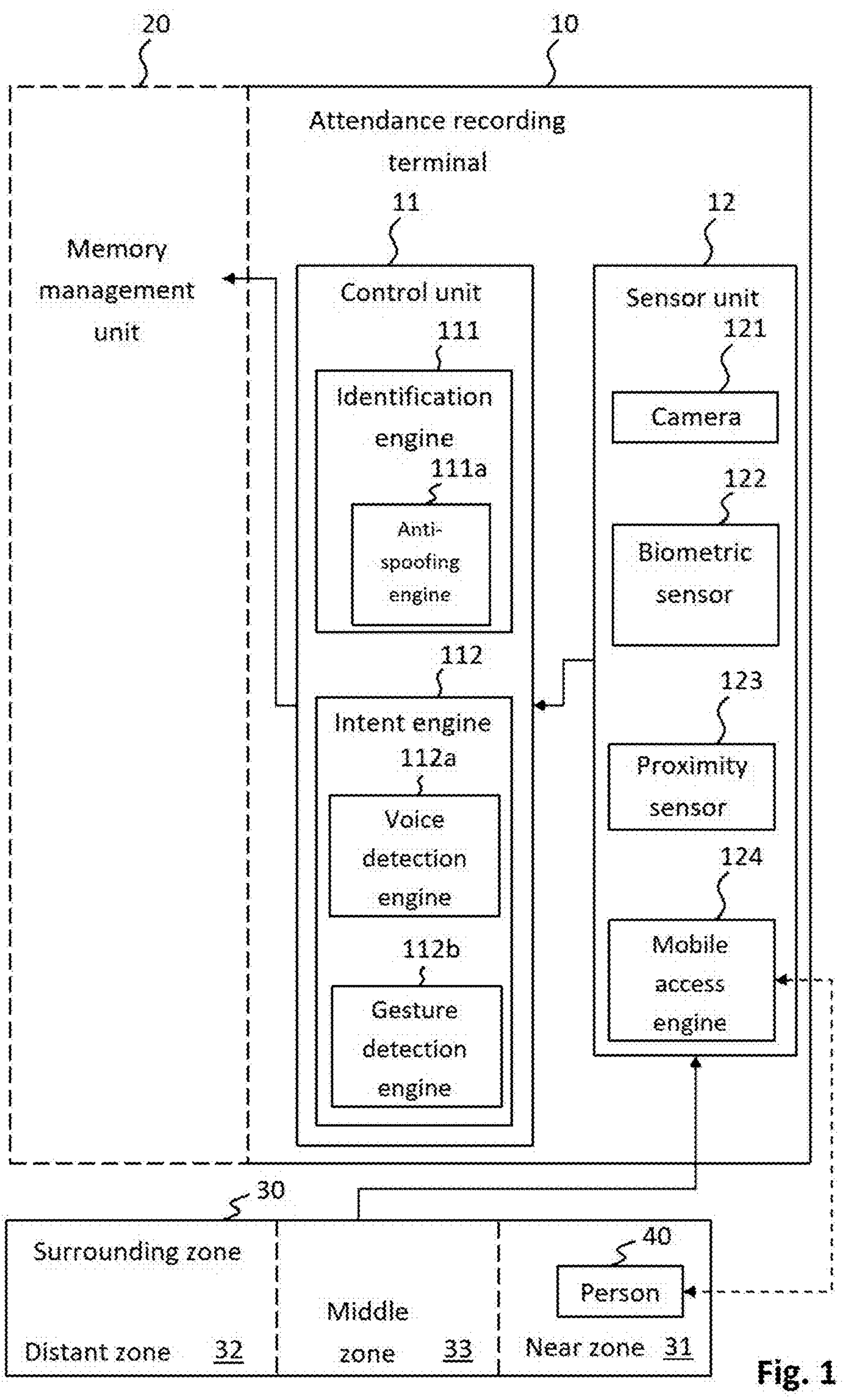
FIG. 1 shows a schematic configuration of an exemplary embodiment of the proposed attendance recording terminal.

The configuration of an exemplary embodiment of a proposed attendance recording terminal 10 is shown schematically in FIG. 1. The attendance recording terminal 10 is a time recording terminal which serves the purpose of enabling time recording by employees, for example at the entrance to a company building. Specifically, different clocking processes can be carried out at the time recording terminal and thus different attendance information can be stored or processed. For example, an employee can clock his/her attendance in or out when he/she takes a break or when his/her working day is over.

The attendance recording terminal 10 is accordingly configured to record attendance information of a person 40 on the basis of an action of the person 40. As shown in FIG. 1, the attendance recording terminal 10 comprises a control unit 11, a sensor unit 12 and a memory management unit 20.

The memory management unit 20 can be provided locally and, for example, be an integrated part of the attendance recording terminal 10, or the memory management unit 20 can also be provided online in the cloud. This is indicated in FIG. 1 by the dashed lines. The attendance recording terminal 10 can then establish an online connection to the memory management unit 20, for example via the control unit 11, and in this way communicate with the memory management unit 20.

Master records of the people 40, which people 40 interact with the attendance recording terminal 10, are stored in the memory management unit 20. Personal data, for example employee-specific information such as working hours, can be stored in the master records. The personal data is available to the attendance recording terminal 10 or its control unit 11 via a communication connection between the memory management unit 20 and the control unit 11. The memory management unit 20 also processes and stores the attendance information of the person 40 as intended, for example that they have now come to work and their working time recording should begin.

For this purpose, the attendance recording terminal 10 has the sensor unit 12. The sensor unit 12 monitors a surrounding zone 30, which surrounding zone 30 surrounds the attendance recording terminal 10 (cf. also FIG. 3). Accordingly, the sensor unit 12 receives signals from the surrounding zone 30, as indicated by the arrow in FIG. 1.

The sensor unit 12 can have different units for monitoring the surrounding zone 30. In the exemplary embodiment of FIG. 1, the sensor unit 12 has the following four units: a camera 121, a biometric sensor 122, a proximity sensor 123 and a mobile access engine 124. In this case, the sensor unit 12 can also have only one of the units or different combinations of the units. The provision of two units of the same type, for example two cameras 121, is also possible. A plurality of separately operating sensor units of different configurations can also be provided.

The presence of the person 40 in the surrounding zone 30 is recorded via the mentioned units of the sensor unit 12, such that the detected presence information of the person 40 can be output. For this purpose, for example, the camera 121 aimed at the surrounding zone 30 monitors the corresponding room, for example a corridor (300 in FIG. 3) surrounding the attendance recording terminal 10, and recognizes by means of image processing as soon as the person 40 enters the surrounding zone 30.

The biometric sensor 122 of the sensor unit 12 can in turn detect a direct action of the person 40 at the sensor unit 12 and thus at the attendance recording terminal 10. For this purpose, for example, the person 40 can perform a fingerprint scan on the biometric sensor 122 or trigger another signal.

The proximity sensor 123 of the sensor unit 12 can be designed in various embodiments and can detect the presence of the person 40 in the surrounding zone 30 in a contactless manner.

The mobile access engine 124 (mobile access device) of the sensor unit 12 records the presence of the person 40 in the surrounding zone 30 via a communication exchange between the mobile access engine 124 and the person 40, specifically a mobile access medium of the person 40. The mobile access medium of the person 40 can be an access card, such as a key card. A keyless transponder (badge) can also be used, or also a mobile device of the person 40, which mobile device has a specific application for communicating with the mobile access engine 124.

The mobile access engine 124 of the sensor unit 12 is configured in such manner that a communication exchange, indicated in FIG. 1 by the dashed double arrow, takes place between the mobile access engine 124 and the mobile access medium of the person in order to be able to record the presence of the person 40 and to output the detected presence information.

For example, the keyless transponder (badge) or the access card of the person 40 can also be equipped with RFID or also with UWB technology (ultra-wideband). A corresponding RFID or UWB module of the mobile access engine 124 then records when the person 40 enters the surrounding zone 30. This function can also be implemented via an application on the mobile device of the person 40.

The mobile access engine 123 can be implemented as software in the attendance recording terminal 10 or in the sensor unit 12 or comprise software via which software the communication exchange between the person 40 and the sensor unit 12 is evaluated and, if necessary, the detected presence information is generated and output.

If the sensor unit 12 observes, for example in one of the ways described, that a person 40 is in the surrounding zone 30 or is entering the surrounding zone 30, then the sensor unit 12 outputs detected presence information of the person 40. An identification engine 111 (identification device) integrated, for example, in the control unit 11 can identify the person 40 on the basis of that detected presence information of the person 40. In this case, the identification engine 111 is configured to output identification information, which identification information for a respective person 40 can be uniquely assigned or at least that person 40 can be assigned uniquely to a predefined group of people. For example, for some interactions it may not be absolutely necessary to uniquely identify the specific person 40, but only to assign them to a group of people. For example, it can be recognized that the person 40 basically belongs to a "permitted" group of people, such that the person 40 can carry out an interaction as long as the interaction does not require a more in-depth, unambiguous identification.

The identification engine 111 can be implemented as software in the attendance recording terminal 10 or in the control unit 11 or can comprise software, via which software detected presence information of the person 40 or other personal information can be evaluated.

If a person 40 was thus basically recorded by the sensor unit 12, then this person can be specifically identified by means of the identification engine 111. The further personal information mentioned, which can be used for identification, does not have to include any personal data, but only enables clarity regarding the person 40 or a person to be clearly distinguishable from other people.

In the example of a camera 121, the detected presence information can be a photo of the person 40. However, only the signal that the camera 121 has captured a person could also be made available to the control unit 11 or the identification engine 111 as simple detected presence information. The specific photo of the person 40 could be made available as other personal information, on the basis of which the specific identification then takes place.

The identification engine 111 is also configured to verify the person 40 and to output verification information. Verification here means a level of detail more than simple identification. The person 40 can be recognized per se or assigned to a group of people via the identification described. However, verification means more extensively that it is also checked whether the identified person 40 is a real person or whether there is a deception, since, for example, an attempt is being made at a deliberate incorrect clocking process. The person 40 is verified on the basis of the detected presence information of the person 40 and/or on the basis of the other personal information.

For this purpose, the identification engine 111 can include an anti-spoofing engine 111*a*, as can be seen in the exemplary embodiment in FIG. 1. The anti-spoofing engine 111*a*, which can be implemented as software in the identification engine 111 or can comprise software, can be used to distinguish between real people and photos of a person that are merely held in front of the camera 121. Such an anti-spoofing engine 111*a* is particularly advantageous if cameras 121 are used as sensor units 12 in order to prevent a deliberately incorrect clocking process at the attendance recording terminal 10.

Figure 2:
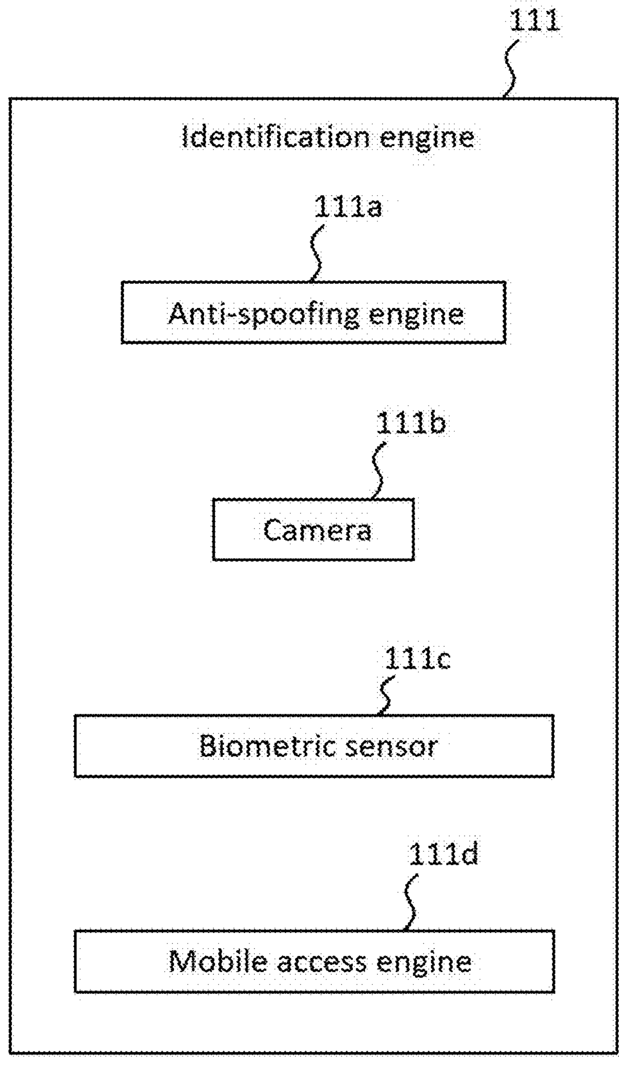
FIG. 2 shows a schematic configuration of an exemplary embodiment of an identification engine of the proposed attendance recording terminal.

The identification engine 111 is therefore either provided with detected presence information or other personal information for evaluating and identifying the person 40, or the identification engine 111 can also detect corresponding information itself. For this purpose, as shown in the exemplary embodiment of an identification engine 111 in FIG. 2, the identification engine 111 can also comprise at least one of the following units: at least one camera 111*b*, at least one biometric sensor 111*c*, and/or at least one mobile access engine 111*d*. The functionalities of the individual units have already been described above in connection with the sensor unit 12, to which reference can be made. It should be explicitly mentioned that the mobile access engine 111*d* of the identification engine 111 is configured in such manner that, in order to identify the person 40, a communication exchange takes place between the mobile access engine 111*d* and a mobile access medium (badge, access card, mobile device or application on a mobile device or the like) of the person 40.

In principle, to reduce individual units, provision can also be made for the identification engine 111 to be able to access the units of the sensor unit 12 (camera 121, biometric sensor 122, mobile access engine 124) directly or to be provided with corresponding information from them.

Furthermore, provision can also be made for the sensor unit 12 and the control unit 11 or the identification engine 111 to be an integral part of the attendance recording terminal 10 and, for example, together with the corresponding sensors, to be installed together in a housing of the attendance recording terminal 10. However, it can also be advantageous to arrange the sensor unit 12 or a part of the sensor unit 12, for example the camera 121, outside of the attendance recording terminal 10 at a favorable point in the surrounding zone 30, while the identification engine 111, for example with its camera 111*b*, is an integral part of the attendance recording terminal 10. Then, using sensor unit 12, a person can advantageously initially be detected further away from attendance recording terminal 10, while the person 40 is identified by means of the identification engine 111 on the basis of the information generated at camera 111*b* on attendance recording terminal 10 itself.

The sensor unit 12 and the identification engine 111 or the control unit 11 can also be configured for interacting in such manner that the sensor unit 12 wakes the identification engine 111 from an energy-saving sleep mode (energy-saving mode) if, in principle, the person 40 has been recorded by the sensor unit 12 in the surrounding zone 30. As a result, the attendance recording terminal 10 can be operated in a more energy-saving manner, since the identification engine 111 only works when a person 40 has arrived at the intended location in the surrounding zone 30 for precise identification.

Figure 3:
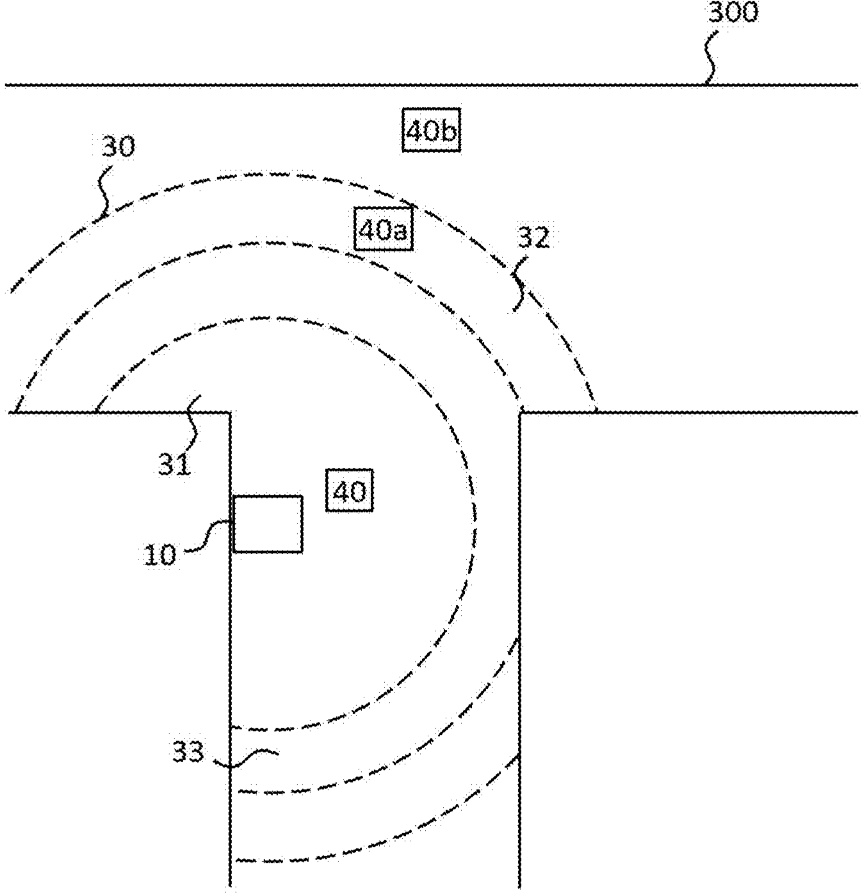
FIG. 3 shows a schematic plan view of an arrangement of a proposed attendance recording terminal in a corridor.
Figure 4:
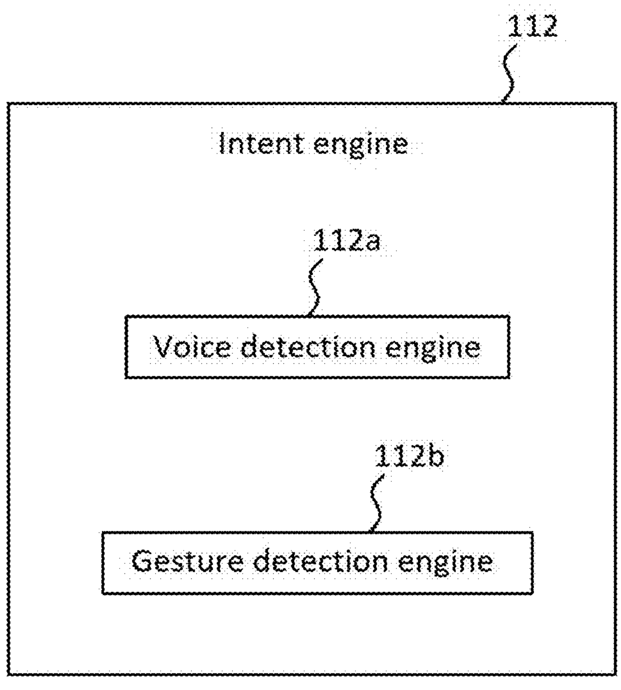
FIG. 4 shows a schematic configuration of an exemplary embodiment of an intent engine of the proposed attendance recording terminal.

The surrounding zone 30, in turn, can be divided into a plurality of sub-zones, as can be seen in FIG. 1 and an example of an arrangement of an attendance recording terminal 10 in a corridor 300 also in FIG. 3. Thus, a near zone 31, which is arranged closest to the attendance recording terminal 10, and a distant zone 32, which is arranged furthest away from the attendance recording terminal 10, are provided. Between the near zone 31 and the distant zone 32 there is a middle zone 33.

Advantageously, the sensor unit 12 outputs specific detected presence information of the person 40, specifically as a function of one or more zone-specific signal/signals, which originates/originate from the person 40 in the mentioned sub-zones.

In this case, the zone-specific signal does not have to be actively triggered by the person 40. Rather, the zone-specific signal is merely caused by the person 40, for example by the presence or by the type of advancing movement of the person 40 in the respective sub-zone. For example, a person 40 in the sub-zone or their movement can be tracked via camera tracking and a zone-specific signal can be generated from this. The zone-specific signal can thus be effected or caused by the simple presence or the movement of the person 40 in the sub-zone.

The following circumstances can flow into the zone-specific signal and thus into the specifically detected presence information of the person 40:

in which sub-zone the person 40 is located, and/or
which sub-zone the person 40 is entering, and/or
what does a movement pattern of the person 40 look like?

The movement pattern of the person 40 can relate to a movement direction of the person 40 and/or a movement speed of the person 40. The movement direction can be represented by a direction vector over time. The movement pattern of the person 40 within a surrounding zone or sub-zone can be recorded and used as a basis for the analysis of the intent of the interaction. Using the information regarding the sub-zone which a person 40 is entering, a change of zone by a person 40 can be detected and can be used as a basis for the analysis.

The technical means for detecting the position, i.e. the presence or the movement of the person 40 in a sub-zone, for example, can advantageously be the sensor unit 12. The sensor unit 12 advantageously includes a camera 121.

In this way, the aforementioned waking of the identification engine 111 from the sleep mode can also take place depending on the sub-zone in which the person 40 is located or how the person 40 is moving in the sub-zone or whether the person 40 is entering that sub-zone. For example, if the person 40 only enters the distant zone 32 and is basically detected there, but that person 40 does not approach the attendance recording terminal 10 any further and therefore does not enter the middle zone 33 or the near zone 31, it can be concluded that the person 40 does not want to interact with the attendance recording terminal 10 at all. If the identification engine 111 is then configured in such manner that it is only activated when the person 40 enters the surrounding zone 30, or more specifically only the middle zone 33 or the near zone 31, then the attendance recording terminal 10 can be operated particularly economically.

The identification engine 111 can be activated in this way as a function of the movement pattern of the person 40, in particular of the movement direction and/or the movement speed of the person 40. An example can be that a faster movement of a person 40 is detected, which then leads to an activation of the identification engine 111.

In this way, the interaction with the attendance recording terminal 10 can also be more user-friendly and faster, since a two-stage activation of the identification engine 111 results in less time until the system is active.

In a particularly advantageous configuration, the control unit 11 or identification engine 111 (or an intent engine 112 described later) has an AI (artificial intelligence) with a machine learning engine. The specifically detected presence information of the person 40 can be analyzed using machine learning and, for example, an intent of the interaction of the person 40 can be recorded. For this purpose, for example, a recorded behavior of the person 40, such as a movement pattern, can be compared with known learned behavior or movement patterns.

The example shown in FIG. 3 of a corridor 300 having a T-junction illustrates the different sub-zones, represented by dashed partial circles, surrounding the attendance recording terminal 10 at different distances. The person 40 who is located in the near zone 31 interacts with the attendance recording terminal 10. The person 40*a*, in turn, is located in the distant zone 32, in which a basic detection of the person 40*a* takes place by means of the sensor unit 12 of the attendance recording terminal 10, but which corresponding detected presence information would not yet lead to the identification engine 111 operating in relation to the person 40*a*. The identification engine 111 is also activated only when the person 40*a* also enters the middle zone 33 or, depending on the desired configuration, the near zone 31. The third person 40*b*, in turn, is located outside the entire surrounding zone 30, such that the person 40*b* is not detected at all. The attendance recording terminal 10 does not detect the person 40*b* in the configuration shown, since it is clear that no interaction with the attendance recording terminal 10 is desired by the person 40*b*.

A fundamental activation of the engines is also conceivable if the person enters the surrounding zone 30 in general, or specifically the distant zone 32 which is the furthest away.

Furthermore, the attendance recording terminal 10 includes an intent engine 112 (intent recognition device) which, as shown for example in FIG. 1, can be a component of the control unit 11. The intent engine 112 recognizes the intent of the person 40 as to why that person 40 is interacting with the attendance recording terminal 10. The intent engine 112 is configured for outputting intent information, which intent information represents the intent of the person 40 regarding the interaction.

The intent of the interaction can be, for example, that the person 40 wants to clock in because their working time is beginning, or that they want to clock out of the time recording system. Furthermore, the intent of the person 40 can also be to call up specific information stored in the master data record. For example, the person 40 could want to inquire about their attendance time or working time completed in a certain predefined period of time. It can also be possible to use the attendance recording terminal 10 to find out to what extent there is still credit on a key card or a person-specific employee card if the key card or the person-specific employee card is also suitable for payment in a canteen or the like.

The intent engine 112 can be implemented as software in the attendance recording terminal 10 or in the control unit 11 or can comprise software, via which software specific information resulting from the actions of the person 40 can be evaluated.

Specifically, the intent engine 112 is configured in such manner that at least one of the following items of information is used to record the intent of the interaction of the person 40 with the attendance recording terminal 10:

a movement direction of the person 40, and/or a signal input by the person 40.

In this case, the intent engine 112 can also be configured in such manner that the movement direction is recorded via camera tracking and/or via an ultra-wideband signal. This is particularly advantageous since no further action by the person 40 is required. For example, from the movement direction of the person 40 from outside the relevant building in the direction of the attendance recording terminal 10, it can be concluded that the person 40 would like to clock in for work. In the opposite case, it could be concluded from the movement direction, in principle in the direction of the building or floor exit, that the person 40 would like to clock out or log a break.

Personal information that is stored, for example, in the memory management unit 20 could also flow into the analysis of the movement of the person 40 and thus into the interpretation of the intent. It can be stored there that a person 40 is currently taking a break or is basically logged out. Then it can be concluded from a fundamentally desired interaction of this person 40 with the attendance recording terminal 10 that the person would like to clock in.

If the information for recording the intent of the interaction of the person 40 is sent via an active signal input by the person 40 themselves, then the intent engine 112 can be configured, for example, in such manner that the signal input takes place as follows:

the intent engine 112 receives a signal which is input by the person 40 on a mobile device and which represents the intent of the interaction, and/or the intent engine 112 receives a voice input from the person 40 representing the intent of the interaction or recognizes a gesture input from the person 40 representing the intent of the interaction, and/or The intent engine 112 processes a signal which is input by the person 40 at the attendance recording terminal 10, for example on a touchscreen display, and which represents the intent of the interaction.

In the first-mentioned case of an active input by the person 40 on their mobile device, it is advantageous that the intent of the interaction can be clearly input by the person 40 and the risk of misinterpretation can thus be reduced. For this purpose, the specific interactions with the attendance recording terminal 10 that are possible for the person can be displayed in an application on the mobile device of the person 40 and then be selected by the person 40. The intent of the interaction is then recorded in the attendance recording terminal 10 and the intent information is provided by a corresponding communication of the mobile device with the attendance recording terminal 10 or specifically with the intent engine 112.

In the second case mentioned above, in which the signal input takes place via the voice input of the person 40 or in which the signal input takes place via a gesture input by the person 40, a corresponding voice detection engine 112*a* (voice recognition device) or gesture detection engine 112*b* (gesture recognition device) is provided. The voice detection engine 112*a* and the gesture detection engine 112*b* can be implemented as software in the control unit 11 or in the intent engine 112 or comprise software, via which the incoming voice signal of the person 40 or the detected gesture or movement of the person 40 can be evaluated.

For example, the person 40 can communicate their intent to interact with the attendance recording terminal 10 via a voice input, such as calling out the word "clock in". If that voice signal is recognized by the voice detection engine 112*a*, the intent engine 112 then outputs the corresponding intent information. In the case of a gesture, provision can be made, for example, for the person 40 to perform a specific movement, which is detected by the sensor unit 12, for example, such that the gesture detection engine 112*b* then recognizes this as an intent to clock in or to clock out and outputs the corresponding intent information. A gesture can also be that the person 40 performs a predetermined movement with their mobile access medium, which movement is then received wirelessly at the attendance recording terminal 10 and processed by the gesture detection engine 112*b* to form the corresponding intent information.

In the third case mentioned above, it is necessary, for example, for the person 40 to input a signal, for example on the touchscreen display of the attendance recording terminal 10 itself, in order to express their intent. In this case, only possible corresponding intents can also be predefined by the attendance recording terminal 10 on the display. The intent engine 112 then processes that input signal to form the corresponding intent information and outputs it.

Both the intent information described and the identification information described above represent important clocking information that the attendance recording terminal 10 processes. Specifically, the control unit 11 receives that identification information from the identification engine 111 and the intent information from the intent engine 112 and processes them. In this case, a comparison takes place as to whether the clocking information received matches predefined clocking information stored in the memory management unit 20. The person 40 specifically interacting with the attendance recording terminal 10 is known via the identification information, and the desired clocking process of the person 40 is known via the intent information. If that intent is possible, such as in the example that the person 40 wants to clock in for work and it is stored in the memory management unit 20 that the person 40 is currently logged out and not clocked in for work, then the corresponding clocking process can be processed and stored in a simple manner automatically. Thus, the attendance information of the person 40 previously stored in the memory management unit 20 is automatically overwritten and newly stored solely on the basis of the identification information provided by the identification engine 111 and the intent information provided by the intent engine 112.

The proposed attendance recording terminal 10 allows in this way a particularly simple operation and interaction between people 40 and the attendance recording terminal 10. So both the basic presence of the person 40 who wants an interaction, as well as the specific interaction itself, i.e. the intent of the interaction of the person 40, are automatically recorded, or are expressed by the person 40 via simple gestures or movements. The clocking processes at the attendance recording terminal 10 are greatly simplified.

In principle, particularly advantageously, both the identification information (by means of the identification engine 111) and the intent information (by means of the intent engine 112) can also be extracted solely from the detection of the person 40 in the surrounding zone 30 by the sensor unit 12 and the corresponding detected presence information. The order of processing is not necessarily in such manner that first the identification information and only then the intent information must be created and output.

The identification information can advantageously also be processed downstream, such that the specific identification of the person 40, i.e. a clear assignment as to which employee it is, may only take place if a specific intent from predefined intents that require identification, is recorded. Intents of the persons 40 which do not require a specific identification of the person 40 can therefore also be possible. This may be clear after analyzing the intent information provided by the intent engine 112.

Figure 5:
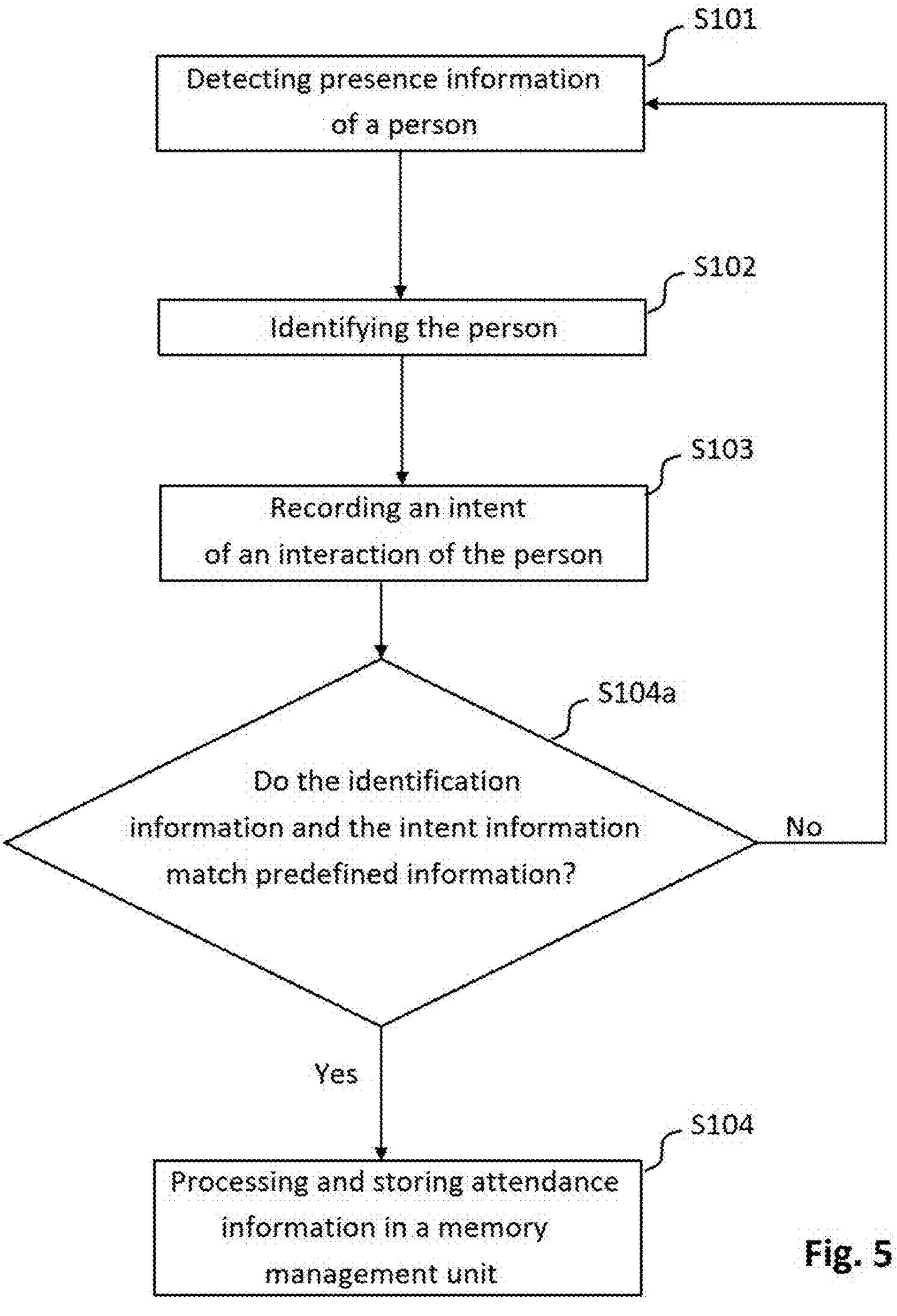
FIG. 5 shows a flowchart of the method steps of a proposed computer-implemented method for operating an attendance recording terminal.

In order to implement the particularly user-friendly, intuitive interaction with the attendance recording terminal 10, the following computer-implemented method, shown schematically in FIG. 5, for operating the attendance recording terminal 10 is proposed: In step S101, the presence information of the person 40 is detected, wherein the detected presence information is generated by monitoring the surrounding zone 30 with the at least one sensor unit 12. In step S102, the person 40 is identified by means of the identification engine 111. The level of detail of the identification can also vary and either the person 40 can be specifically identified unequivocally or else only be assigned to a group of people. As described above, this can also be made dependent on the recorded intent of the interaction of the person 40 with the attendance recording terminal 10. In step S102, identification information is generated on the basis of the detected presence information of the person 40 and/or on the basis of at least one other item of personal information.

In step S103, the intent of the interaction of the person 40 with the attendance recording terminal 10 is recorded by means of the intent engine 112 and the corresponding intent information is generated. This step S103 can also take place before step S102 or simultaneously with it. As described above, the recorded monitoring data of the sensor unit 12 can be used to create both the identification information and the intent information. In terms of the level of detail, the step S102 of identifying can also be made dependent on which interaction is intended, i.e. which intent information was generated.

The generated identification information and intent information are then matched with predefined information (clocking information) (step S104*a*). For this purpose, the control unit 11 of the attendance recording terminal 10 interacts with the memory management unit 20 as previously described. In step S104, the attendance information of the person 40 is then processed in the memory management unit 20 and stored automatically if that comparison (step S104*a*) has shown that the identification information and the intent information correspond to predefined information. The attendance information can be, for example, that the person 40 has now come to work and the working time recording begins. In this respect, the attendance recording terminal 10 can represent a time recording terminal.

The features and advantages described in the context of the proposed and illustrated attendance recording terminal 10 can be transferred accordingly to the proposed computer-implemented method for operating an attendance recording terminal. Specifically, the computer-implemented method is configured for operating that proposed and described attendance recording terminal 10. The proposed attendance recording terminal 10 described here is in turn configured for carrying out the proposed computer-implemented method for operating an attendance recording terminal. In this respect, the features characterizing the attendance recording terminal 10 and the method for operating the attendance recording terminal 10 and specific advantages have been previously described and will be described below in general only simply.

As proposed, a further control level can also be integrated into the attendance recording terminal 10. The person 40 is then given feedback about the clocking process that has taken place, i.e. about the change made to the attendance information in the memory management unit 20 or also about the fact that no change was made.

The memory management unit 20 is then advantageously configured in such manner that when the attendance information has been stored, the memory management unit 20 checks in the data of the person 40 in its master record of the personal data whether feedback is desired about the interaction of the person 40 with the attendance recording terminal 10.

Figure 6:
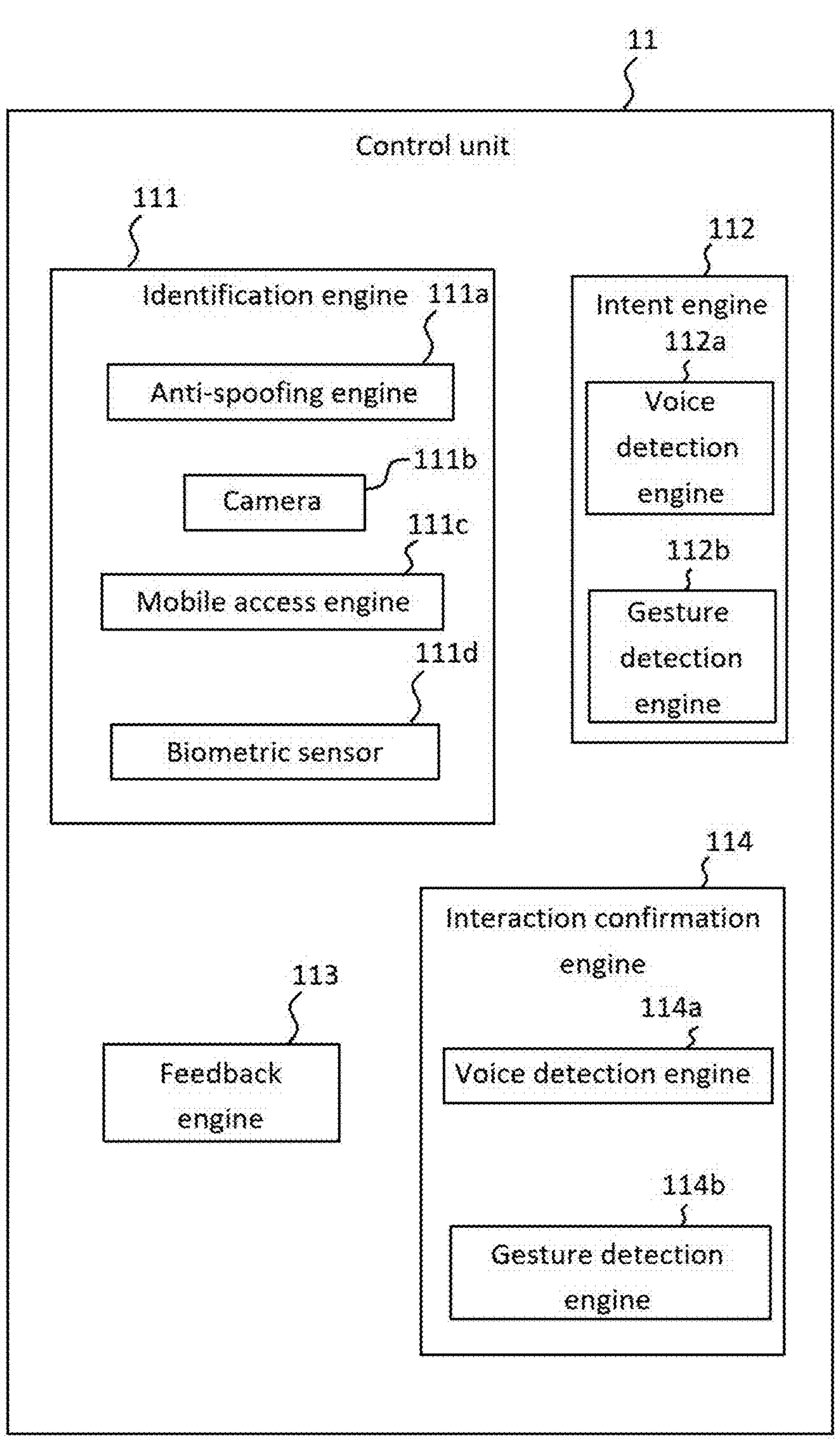
FIG. 6 shows a schematic configuration of an exemplary embodiment of a control unit of the proposed attendance recording terminal.

The attendance recording terminal 10 or the control unit 11 can also have a feedback engine 113 (feedback device) in addition to the identification engine 111 and intent engine 112, as shown in FIG. 6. The feedback engine 113 is configured in such manner that feedback information can be output when the person 40 has interacted with the attendance recording terminal 10. The feedback information can be output at the attendance recording terminal 10, for example on the display thereof or via loudspeakers, or also on the mobile access medium of the person 40. The feedback information can be output as a voice signal and/or as a graphic signal and/or as a haptic signal, such as a vibration signal on the mobile access medium.

The feedback information can, for example, also include a request or user information with which an operator of the attendance recording terminal (e.g. employer) requests the person 40 who is interacting with the attendance recording terminal 10 as a user to do something or informs them about something. A request to the person 40 could be as follows: "Report to the HR department", "Please reduce overtime" etc. Simple information could be given about the current time account balance.

Provision can advantageously be made for sensitive, personal information to be output only on the mobile device of the person 40, while general and non-sensitive information is output only on the attendance recording terminal 10 or on the attendance recording terminal 10 and the mobile device.

The feedback engine 113 can be implemented at least partially as software in the attendance recording terminal 10 or in the control unit 11, via which software it can be checked, on the one hand, using the memory management unit 20 whether the person 40 wants feedback and, on the other hand, that corresponding feedback can be initiated. Accordingly, the feedback engine 113 or the control unit 11 can be in communicative connection with a voice output unit if, for example, a voice signal is desired as feedback information.

It is particularly advantageous to check in the master record of the personal data beforehand whether the specific person 40 who is performing the interaction and who was previously identified wants feedback at all, and if so, in what form the feedback is wanted. The feedback engine 113 can therefore be configured in such manner that person-dependent feedback information can be output. For example, a voice signal can be output in the respective language of the person 40. Furthermore, for example, in the case of a person 40 with a hearing impairment, provision could be made for this person 40 to receive a different signal as feedback information, for example the mentioned graphic or haptic signal.

In order to increase the security of a correct interaction between the person 40 and the attendance recording terminal 10, an interaction confirmation engine 114 (interaction confirmation device) is also provided in the attendance recording terminal 10 or the control unit 11 in the exemplary embodiment of FIG. 6.

The interaction confirmation engine 114 may receive clarifying intent information. The clarifying intent information is intended to verify or falsify the intent of the interaction of the person 40 with the attendance recording terminal 10 that has actually already been recorded. It is then advantageous if the clarifying intent information represents further clocking information for the control unit 11. In addition to the identification information and intent information, it is then made dependent on this further clocking information whether or not the automatic clocking process is to be carried out in the memory management unit 20.

For this purpose, the interaction confirmation engine 114 can be implemented at least partially as software in the attendance recording terminal 10 or in the control unit 11, via which software corresponding signals or actions of the person 40 can be evaluated to confirm or deny the previously recorded intent.

The interaction confirmation engine 114 can be designed as a voice detection engine 114*a* (voice recognition device) for recording a voice input by the person 40 and/or as a gesture detection engine 114*b* (gesture recognition device) for recording a gesture input by the person 40. For this purpose, reference can be made to the description of the voice detection engine 112*a* or gesture detection engine 112*b* above.

In concrete terms, clarifying intent information can consist, for example, of the person 40 confirming via a voice signal (for example a pronounced "yes") that they desire the recorded interaction and that this should be carried out. Contact-based clarifying intent information is also conceivable, for example in that the person 40 performs an input on the attendance recording terminal 10 or on their mobile access medium. However, voiceless and contactless confirmations by the person 40 are also conceivable, for example by the person 40 performing a specific gesture, for example also with their mobile access medium. A specific movement of the mobile access medium can be identified by the interaction confirmation engine 114 as clarifying intent information, for example via RFID or UWB technology.

The invention claimed is:

1. An attendance recording terminal (10), which is designed as a time recording terminal, for recording attendance information of a person (40) on the basis of an action of the person (40), the attendance recording terminal comprising:

a control unit (11), a memory management unit configured for processing and storing the attendance information of the person (40), at least one proximity sensor unit configured for recording movement data of the person and monitoring a surrounding zone (30) and for outputting presence information of the person (40) detected from the monitoring of the surrounding zone (30), an identification engine configured for identifying the person (40) and for outputting identification information, wherein the person (40) can be identified on the basis of the detected presence information of the person (40) and/or on the basis of at least one other item of personal information, and an intent engine wherein intent information is generated, the intent engine being configured for recording an intent of an interaction of the person (40) with the attendance recording terminal (10) and for outputting intent information, and data from the intent engine is used as a basis to record the intent of the person, wherein the control unit (11) is configured for receiving and processing at least the following clocking information:

the identification information from the identification engine (111), and the intent information from the intent engine (112), wherein the control unit (11) is configured for interacting with the memory management unit (20) such that if received clocking information matches predefined clocking information, the attendance information of the person (40) is automatically processed and stored, wherein the intent engine (112) is configured such that at least the following information is used to record the intent of the interaction of the person (40) with the attendance recording terminal (10):

a movement direction of the person (40), wherein the intent engine (112) is further configured such that the movement direction is recorded via camera tracking and/or via an ultra-wideband signal.

2. The attendance recording terminal according to claim 1, wherein the control unit (11) is further configured for receiving and for processing the detected presence information of the person (40) from the sensor unit (12).

3. The attendance recording terminal according to claim 1, wherein the surrounding zone (30) is divided into a plurality of sub-zones, wherein the plurality of sub-zones comprises at least the following sub-zones:

a near zone (31), and a distant zone (32), wherein the near zone (31) is arranged closer to the attendance recording terminal (10) than the distant zone (32), wherein the sensor unit (12) outputs a specific detected item of presence information of the person (40) as a function of a zone-specific signal, wherein the zone-specific signal is triggered by the person (40) in the sub-zone, wherein, the specific detected presence information of the person (40) includes information about the following circumstances:

in which sub-zone the person (40) is located, and/or which sub-zone the person (40) is entering, and/or what a movement pattern of the person (40) looks like.

4. The attendance recording terminal according to claim 1, wherein the identification engine is configured such that the identification engine is only activated when the person (40) enters the surrounding zone (30), wherein the identification engine is activated such as a function of one of the persons (40).

5. The attendance recording terminal according to claim 3, wherein the plurality of sub-zones further comprises a middle zone (33), wherein the middle zone (33) is arranged closer to the attendance recording terminal (10) than the distant zone (32).

6. The attendance recording terminal according to claim 1, wherein the identification engine (111) is also configured for verifying the person (40) and for outputting verification information, wherein the person (40) is verified on the basis of the detected presence information of the person and/or on the basis of the other personal information.

7. The attendance recording terminal according to claim 6, wherein the identification engine (111) comprises at least one anti-spoofing engine (111*a*) for differentiating between a real person and a photo of a person.

8. The attendance recording terminal according to claim 1, wherein the sensor unit (12) comprises at least one of the following units:

at least one camera (121), at least one biometric sensor (122) configured to detect a direct action of the person at the sensor unit, at least one proximity sensor (123) configured to detect presence of the person in the surrounding zone, and/or at least one mobile access engine (124), wherein the mobile access engine (124) of the sensor unit (12) is configured such that, in order to detect the presence information of the person (40), a communication exchange takes place between the mobile access engine (124) and a mobile access medium of the person (40).

9. The attendance recording terminal according to claim 8, wherein the identification engine (111) comprises at least one of the following units:

at least one camera (111*b*), at least one biometric sensor (111*c*) configured to detect a direct action of the person at the sensor unit, and/or at least one mobile access engine (111*d*), wherein the mobile access engine (111*d*) of the identification engine (111) is configured such that, in order to identify the person (40), a communication exchange takes place between the mobile access engine (111*d*) and the mobile access medium of the person.

10. The attendance recording terminal according to claim 9, wherein the mobile access medium of the person (40) is designed as an access card, a badge and/or a mobile device.

11. The attendance recording terminal according to claim 10, wherein the intent engine (112) is configured such that the following information is used to record the intent of the interaction of the person (40) with the attendance recording terminal (10):

a signal input by the person (40), wherein the intent engine (112) is further configured such that the signal input is as follows:

the intent engine (112) receives a signal which is input by the person (40) on the mobile device and which represents the intent of the interaction, and/or the intent engine (112) receives a voice input from the person (40) representing the intent of the interaction or recognizes a gesture input from the person (40) representing the intent of the interaction, and/or the intent engine (112) processes a signal which is input by the person (40) at the attendance recording terminal (10), and which represents the intent of the interaction, and/or the intent engine (112) receives a signal which is triggered by the person (40) by means of an action with the access card, the badge, and/or the mobile device and which represents the intent of the interaction.

12. The attendance recording terminal according to claim 1, wherein an interaction confirmation engine (114) is also provided, wherein the interaction confirmation engine (114) is configured for receiving clarifying intent information, wherein the clarifying intent information verifies or falsifies the intent of the interaction of the person (40) with the attendance recording terminal (10), wherein the clarifying intent information represents further clocking information for the control unit (11).

13. The attendance recording terminal according to claim 12, wherein the interaction confirmation engine (114) is designed as a voice detection engine for recording a voice input by the person (40) and/or as a gesture detection engine for recording a gesture input by the person (40).

14. The attendance recording terminal according to claim 1, wherein a feedback engine (113) is also provided, wherein the feedback engine (113) is configured such that when the person (40) interacts with the attendance recording terminal (10), feedback information can be output, wherein the feedback information is designed as follows:

a voice signal, and/or a graphic signal, and/or a haptic signal, wherein the feedback information is output on the attendance recording terminal (10) and/or on a mobile access medium of the person (40).

15. The attendance recording terminal according to claim 14, wherein the memory management unit (20) comprises a master record of personal data, wherein the memory management unit (20) is configured such that when the attendance information has been stored, the memory management unit (20) checks in the data of the person (40) as to whether feedback is desired about the interaction of the person (40) with the attendance recording terminal (10).

16. A computer-implemented method for operating an attendance recording terminal (10), for recording attendance information of a person (40) on the basis of an action of the person (40), the method including the following steps:

detecting presence information of the person (40), wherein detected presence information is generated by monitoring a surrounding zone (30) with at least one sensor unit (12) configured to record movement data of the person, identifying the person (40) through an identification engine (111), wherein identification information is generated on the basis of the detected presence information of the person (40) and/or on the basis of at least one other item of personal information, recording an intent of an interaction of the person (40) with the attendance recording terminal (10) by an intent engine (112), wherein intent information is generated, wherein the intent engine (112) is configured such that, in order to record the intent of the interaction of the person (40) with the attendance recording terminal (10) and for outputting intent information, and data from the intent engine is used as a basis to record the intent of the person, whereby at least the following information is used: a movement direction of the person (40), wherein the intent engine (112) is further configured such that the movement direction is recorded via camera tracking and/or via an ultra-wideband signal, and processing and storing attendance information of the person (40) in a memory management unit (20) if it is at least determined that the identification information and the intent information correspond to predefined information.

17. A system comprising a processor coupled to a non-transitory memory that is configured to store a software computer program that performs operations comprising commands which, when the program is executed by a processor of an attendance recording terminal (10), causes the attendance recording terminal (10) to perform the steps of the method according to claim 16.

* * * * *